(12) United States Patent
Singh

(10) Patent No.: US 9,684,307 B2
(45) Date of Patent: Jun. 20, 2017

(54) CONTROL VALUE GENERATION UNIT BASED AUTOMATIC FLIGHT CONTROL SYSTEM

(71) Applicant: ROCKWELL COLLINS INC., Cedar Rapids, IA (US)

(72) Inventor: Avanindra Singh, Hyderabad (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/993,483

(22) Filed: Jan. 12, 2016

(65) Prior Publication Data

US 2016/0349760 A1 Dec. 1, 2016

(30) Foreign Application Priority Data

May 28, 2015 (IN) .......................... 1535/DEL/2015

(51) Int. Cl.
*G05D 1/08* (2006.01)
(52) U.S. Cl.
CPC ................................. *G05D 1/0808* (2013.01)
(58) Field of Classification Search
CPC ..... G05D 1/0808; G05D 1/0008; B64C 19/00
See application file for complete search history.

(56) References Cited

U.S. PATENT DOCUMENTS

| | | | | |
|---|---|---|---|---|
| 7,356,336 B2* | 4/2008 | Perez | ..................... | G07C 5/008 455/345 |
| 8,145,364 B2* | 3/2012 | Mira | .................. | B64D 45/0015 244/197 |
| 2010/0258678 A1* | 10/2010 | Fermor | .................. | B64D 43/02 244/196 |
| 2012/0158221 A1* | 6/2012 | Al Fadhli | ................. | B64F 1/02 701/16 |
| 2013/0035805 A1* | 2/2013 | Spinelli | ................ | G05D 1/0061 701/2 |

* cited by examiner

*Primary Examiner* — Richard Camby
(74) *Attorney, Agent, or Firm* — Donna P. Suchy; Daniel M. Barbieri

(57) ABSTRACT

An autopilot system, comprising: an auto-pilot unit adapted to provide one or more controlling parameters to control one or more control components of an aircraft; an override unit operatively coupled to said auto-pilot unit; at least one sensor adapted to capture data associated with at least one external parameter; and a Control value generation unit (CGU) operatively coupled to said override unit, said CGU comprising at least one processor and a database, said database stores information pertaining to at least one flight data; characterized in that said CGU configured to generate one or more predictive control values based on the flight data and the external parameters and provide the generated control values to override unit; and the override unit is configured to accept or ignore the predicted control values based on the pilot's selection.

10 Claims, 4 Drawing Sheets

CONTROL VALUE GENERATION UNIT BASED AUTOMATIC FLIGHT CONTROL SYSTEM

FIELD OF THE INVENTION

The present invention relates to an autopilot system, and more particularly, it relates to a control value generation unit (CGU) based autopilot system, which is adapted to provide effective automatic flight control.

BACKGROUND OF THE INVENTION

Autopilot systems in aircrafts provide assistance in controlling the flight without help of a pilot via a Flight Management System (FMS). In a typical scenario, when the aircraft stabilizes during the flight, the pilot can set predetermined parameters such as altitude and speed via cockpit display units, which display to the flight crew, including a pilot and co-pilot, a wide range of aircraft, flight, navigation, and other information pertaining to the operation and control of the aircraft. Subsequently, the autopilot mode is engaged for pilot's assistance.

The FMS includes processors, memory and navigation database. The FMS is coupled to sensors and an autopilot system of the aircraft. The navigation database includes all of the information required for building a flight plan, consisting of: Waypoints/Intersection, Airways, Radio navigation aids including distance measuring equipment (DME), VHF omnidirectional range (VOR), Non-directional beacons (NDBs), instrument landing systems (ILSs), Airports, Runways, Standard instrument departure (SID), Standard terminal arrival (STAR), Holding patterns (only as part of IAPs—although can be entered by command of ATC or at pilot's discretion), and Instrument approach procedure (IAP). The sensors are adapted to capture the real-time flight data. During the flight, if the pilot selects FMS as the navigation reference then autopilot compares the pre-set values of FMS with the real flight data and the autopilot maneuvers the aircraft in such a way that those two differences between the reference value and the real time flight data is zero.

The autopilot system is therefore adapted to control certain key systems of the aircraft without constant human intervention so as to provide relief to the pilot during mundane stages of a flight such as, high-altitude cruising, etc. However, since the weather conditions/flight data during a flight are dynamic in nature, typical autopilot systems are non-effective when there are sudden changes in such conditions/parameters as they may not be adapted to handle such changes and the pilot must rely on his own experience/expertise to fly the aircraft manually.

Also, in a scenario, where a pilot is inexperienced in a particular flight path, the pilot has to operate in conditions where he has no experience of dynamic climatic conditions occurring between said flight paths and therefore, guiding the aircraft in accordance with the pre-selected flight parameters may not be appropriate. Accordingly, there is also a requirement for a system which can provide guiding parameters to the pilot, which can assist him in deciding the parameters required to seamlessly control the flight between the destinations.

SUMMARY OF THE INVENTION

The primary objective of the present invention is to provide an enhanced autopilot system which includes a control value generation unit (CGU) to provide one or more predictive control value to the pilot in order to facilitate an autopilot mode or manual mode based on the current flight conditions.

Another objective of the present invention is provide an improved method for recommending one or more predictive control value to the pilot for engaging the autopilot mode, or for operating the flight in manual mode based on the parameters suggested by the control value generation unit (CGU) taking into account the current flight conditions.

To foregoing and other objects, features and advantages of the invention will be apparent from the following detailed description in conjunction with the drawings described hereinafter. It is to be appreciated that these drawings depict only typical embodiments of the invention and are therefore not to be considered limiting in its scope.

DETAILED DESCRIPTION OF THE INVENTION

Figure 1:
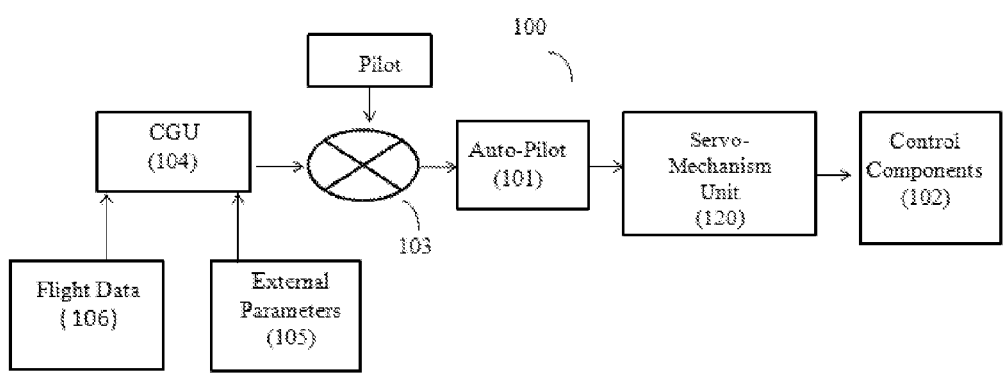
FIG. 1 illustrates an auto pilot system, according to the present invention.

FIG. 1 illustrates an automatic flight control system (100), according to an embodiment of the present invention. The automatic flight control system (100) comprises an autopilot unit (101), at least one control component (102), a FMS system (109) (shown in FIG. 2) and a pilot override unit (103). The system (100) further comprises a servomechanism unit (120) which is adapted to capture control signals from the autopilot unit (101). The servomechanism unit (120) controls the at least one control component (102) to maintain the desired flight altitude, pitch and roll.

In an embodiment, the at least one control component (102) comprises moveable components such as ailerons, elevator, rudder, flaps etc. which are disposed on an aircraft to enable the aircraft to maintain the required speed, altitude and course of the flight.

During the flight, when the aircraft stabilizes at an altitude and follows a fixed path on a navigation chart between destinations, the pilot sets predetermined parameters such as speed, altitude, pitch, roll etc. and may switch to autopilot mode. During the autopilot mode, the aircraft continues its flight based on the pre-set parameters, and follows a fixed path according to the navigation chart. When any of the external parameters changes like weather and traffic, the pilot is alerted and may choose to disengage the autopilot mode and continue the flight in manual mode. Alternatively, the pilot may change some of the pre-set parameters and continue the flight in autopilot mode. However, in both cases, the pilot has to make his decision based on his experience and expertise of the situation at hand. The automatic flight control system (100) of the present invention, in order to assist the pilot in continuing the autopilot mode, further comprises a control value generation unit (CGU) (104) which is adapted to provide one or more predictive control values to the pilot in order to enable him to select either an autopilot mode or manual mode based on the current flight conditions.

The control value generation unit (CGU) (104) is coupled to the override unit (103) and is adapted to provide one or more predicted control value for the current flight conditions.

During operation, the control value generation unit (CGU) (104) is adapted to receive data associated with one or more external parameters (105) which are received through the sensors (112a . . . n) deployed on the aircraft. The external parameters (105) include, for example, data pertaining to weather, traffic, GPS location, altitude, airspeed, heading, roll angle, pitch angle, ground speed ground speed, throttle etc. In an embodiment, the external parameters may also refer to real-time parameters which are measured via the sensors (112 a . . . n) deployed on the aircraft.

A database (108) of the control value generation unit (CGU) (104) is pre-stored with the information's pertaining to one or more flight data (106) associated with a flight path and said information includes but not limited to altitude, airspeed and heading. The database (108) also include historical data collected over, for example, 10000 flights between fixed path destination; climate conditions over the fixed path over a period of time, for example over the years or decade; feedback received from pilots during the flights between said destinations; and the flight operating data collected over fixed destination.

Based on the external parameters (105) and the flight data (106), the CGU (104) is configured to determine the predictive control values to be presented to the pilot for consideration at certain instances during the flight. For example, predictive control value may be presented when the aircraft suddenly encounters a change in the weather or air traffic. Once the information is presented to the pilot, based on the pilot's experience over the current path of flight, the pilot may choose to continue with the autopilot mode by accepting the predictive control value, wherein the current auto-pilot parameters are updated by the CGU (104) and the flight is resumed in auto-pilot mode using updated values. Alternatively, the pilot may choose to override the predictive control value provided by the CGU (104) i.e., to disengage the autopilot mode and fly the aircraft in manual mode using a combination of his experience and expertise and the predictive control value provided by the CGU (104). If autopilot mode is continued, the servomechanism unit (120) receives the updated values from the autopilot unit (101) and based on these values controls the control components (102) in order to enable the aircraft to maintain the required altitude, pitch and roll of the aircraft.

The pilot override unit (103) comprises an interface (not shown) which enables the pilot to select or override the determined control parameters by the CGU (104). The pilot override unit (103) is adapted to receive the predictive control parameters from the CGU (104) and transmit these predicted control values to the autopilot unit (101) based on the pilot's selection. Based on the pilot's selection, the pilot override (103) accept or reject the value from CGU (104). Based on the pilot's selection, the predicted control values is passed on to the autopilot unit (101) as pre-select values In an alternate embodiment, if the pilot does not want autopilot to follow parameter provided by the CGU (104) then, the pilot may still allow the autopilot to work without taking any reference from the CGU (104).

Figure 2:
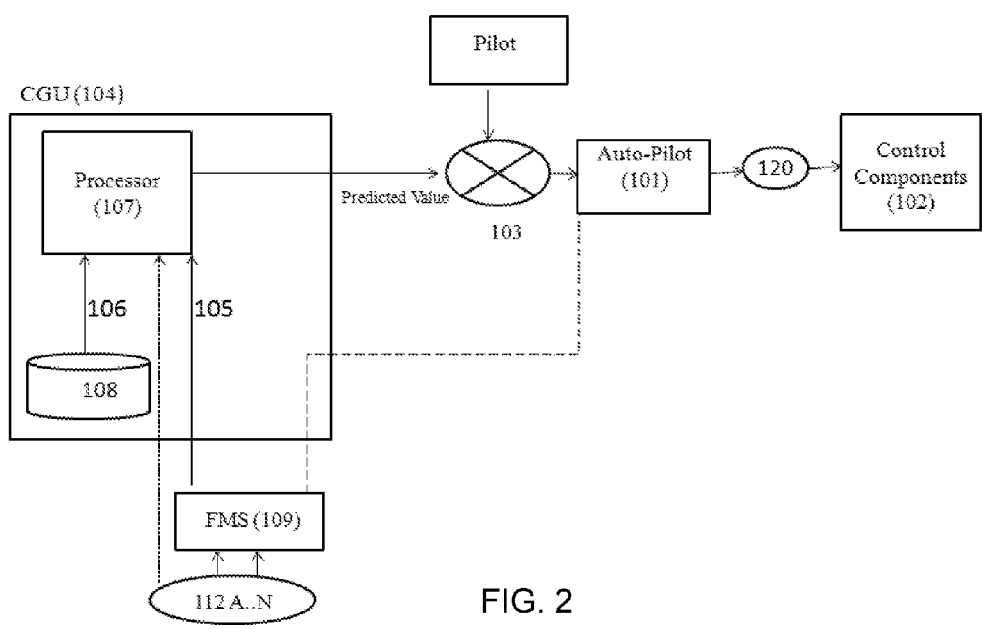
FIG. 2 illustrates a control value generation unit (CGU) (104), according to the present invention.

A more detailed explanation on the control value generation unit (CGU) (104) and its embodiments are described in FIG. 2.

FIG. 2 illustrates the control value generation unit (CGU) (104) according to an embodiment of the present invention. The CGU (104) comprises at least one processor (107), at least one database (108) coupled to said processor (107). The database (108) is arranged to store the information's pertaining to the flight data (106) as described above and the said processor (107) is configured to generate at least one predicted control value based on the information's stored in the database (108). The processor (107) is further operatively coupled to the FMS (109), the FMS (109) is coupled to one or more sensors (112 a . . . n) of aircraft and is configured to provide to the processor (107), the external parameters which may be based on real time measurements. In an alternate embodiment, one or more external parameters (105) may also be directly received by the CGU (104). Further, the external parameters (105) like weather conditions and traffic information may be received from weather Radar and Traffic Collision Avoidance System (TCAS) respectively which can be directly transmitted to the CGU (104).

The processor (107) is configured to receive both the information's pertaining to the flight data (106) stored in the database (108) and the data pertaining to the external parameters (105) received through the sensors (112 a . . . n) and determine the one or more predicted control values. The output of the processor (107) is coupled to the override unit (103) of the automatic flight control system (100) and the predicted control values is presented to the pilot via the override unit (103) of the said flight control system (100). Based on the pilot's selection, the predicted control values can be passed on to the autopilot unit (101) as pre-select values. In a scenario, where the pilot accepts the predicted control values via the override unit (103), the autopilot mode is continued and the autopilot system (100) is updated with new predicted control values, which in turn appropriately operate the servomechanism unit (120) which is coupled to the control components (102) of the aircraft. This enables the pilot to avoid disengaging the auto-pilot mode during the flight and continue the autopilot mode using the updated control parameters which is determined automatically by the proposed CGU (104) of the present invention. This reduces the burden of the pilot to determine the right control parameters during disengaging auto-pilot mode.

In an embodiment, the processor (107) is further configured to receive the pilot input/decision with regard to predictive control values provided by the CGU (104) and store them in database (108) coupled to said processor (107), thereby learning about the pilot's preferences for the desired flight conditions and use the same in determining future predicted control parameters. This also helps in learning the pilot's selection when the autopilot system (100) is operated.

In an exemplary embodiment of the present invention, during operation, the CGU (104) provides one or more predictive control value to the pilot for engaging the auto-pilot mode, or for operating the flight in manual mode. Concurrently, the CGU (104) also enables the database (108) to update the learning about the pilot's preferences for the desired flight condition.

In an embodiment, the processor (107) is adapted to generate predictive control values based on machine learning and prediction algorithms. In a preferred embodiment of the present invention, two separate processors may be used to run machine learning algorithm and prediction algorithm in order to separate the process of value prediction and enabling the system (100) learn through the experience.

In an exemplary embodiment of the present invention, information relating to at least 10000 iterations of flight data in varied weather condition is stored in the database (108) to make a good prediction model.

In another embodiment, the CGU (104) is encapsulated in processing cabinet and is configurable with any automatic flight control system (100) between fixed path destinations. The processing cabinet can be mold to any shape as per requirement. However, in the preferred embodiment, the processing cabinet may be of the rectangular shape.

Figure 3:
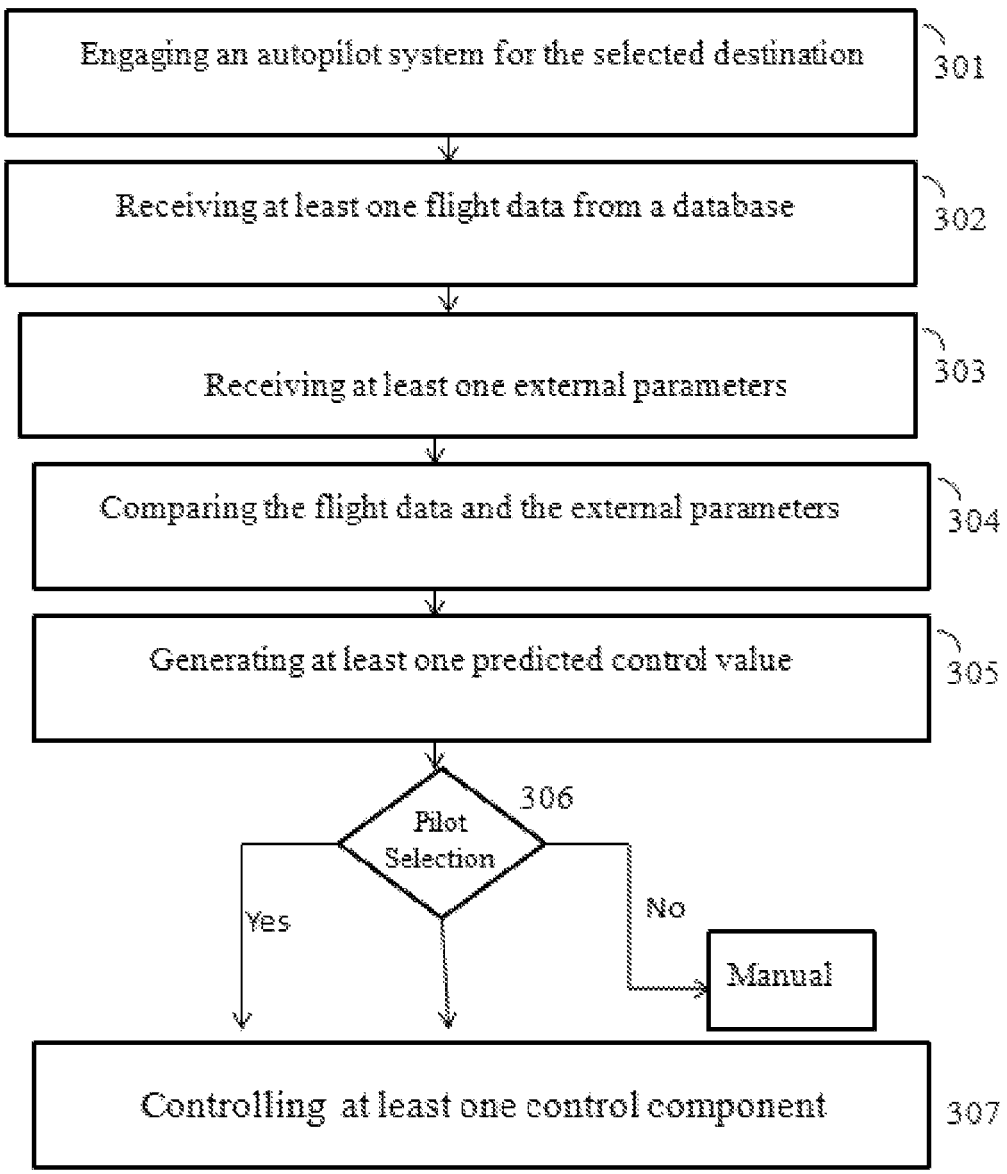
FIG. 3 illustrates flow chart to illustrate a method of providing autopilot system, according to the present invention.

FIG. 3 illustrates the method steps involved in the autopilot system (100), according to an embodiment of the present invention.

In step 301, the pilot sets pre-determined parameters such as speed, altitude, pitch, roll etc. and engages the automatic flight control system (100) for the selected destination. In step 302, the CGU (104) captures the information pertaining to the flight data (106) from the database (108), said database (108) also stores the historical data collected over for example 10000 flights for said destination. In step 303, the CGU (104) receives the real-time external parameters (105) which are measured by the sensors (112 a . . . n) coupled with the FMS system (108). For example, external parameters like weather conditions and traffic information are received from Weather Radar and TCAS respectively. In step 304, the CGU (104) receives both the data pertaining to the external parameters (105) and the information pertaining to the flight data (106) and determines at least one predicted control value via the processor (107). In step 305, the predicted control values are presented to the pilot to make his selection based on the current flight condition via the override unit (103). In step 306, based on the pilot's selection, the autopilot unit (101) either follows or ignores the predicted control values provided by CGU.

Accordingly, if the pilot's selection is "Yes", then autopilot follows CGU values. If the pilot's selection is "No", then pilot does not want autopilot to follow parameters provided by the CGU (104). The pilot may still allow the autopilot to work without taking any reference from the CGU (104).

Figure 4:
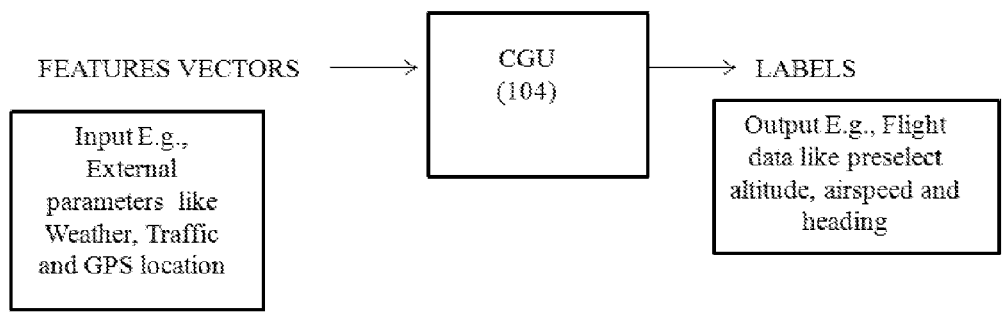
FIG. 4 illustrates control value generation unit (CGU) (104) model, according to the present invention.

In an embodiment of the present invention, the CGU (104) is trained on pre-defined set of "training examples", which then facilitate its ability to reach an accurate conclusion when new data is feeded. The Concept is based on Features and Labels which is illustrated in FIG. 4.

Consider an equation:

$$y = C0 + C1x$$

Here y is the output or a label and x is an input or feature vector. C0 and C1 are the constants. The CGU (104) provides the perfect values of C0 and C1 to make this prediction model work. Optimizing the predictor is done using training examples. For each training example, there is a set of input values x, for which a corresponding output, y, is known in advance. For each example, the difference between the known is found, correct value y, and the predicted value. With enough training examples, these differences give a useful way to measure the "wrongness" of the prediction model. The equation can then be tweaked by tweaking the values of C0 and C1 to make it "less wrong". This process is repeated over and over until the system has converged on the best values for C0 and C1. In this way, the predictor becomes trained, and is ready to do some real-world predicting.

One of the important advantages of the auto pilot system (100) according to the present invention is that the aircraft is enabled to make the intelligent decisions like setting frequencies, pre-select values and controlling flight control component based on the collected data.

In another advantage, the autopilot system (100) reduces the pilot workload as the system (100) will select most of the parameters by itself.

In further advantages, the autopilot system (100) will set a path to fully automated flight between fixed routes using the CGU (104)

The invention has been described above with reference to numerous embodiments and specific examples. Many variations will suggest themselves to those skilled in this art in light of the above detailed description.

While in accordance with the Patent Statutes, the best mode and preferred embodiments have been set forth, the scope of the invention is not limited thereto, but rather by the scope of the attached claims.

What is claimed is:

1. An autopilot system, comprising:
   an auto-pilot unit adapted to provide one or more controlling parameters to control one or more control components of an aircraft;
   an override unit operatively coupled to said auto-pilot unit;
   at least one sensor adapted to capture data associated with at least one external parameter; and
   a control value generation unit (CGU) operatively coupled to said override unit, said CGU comprising at least one processor and a database, said database stores information pertaining to at least one flight data;
   wherein said CGU configured to generate one or more predictive control values based on the flight data and the external parameters and provide the generated control values to override unit; and
   the override unit is configured to accept or ignore the predicted control values based on a pilot's selection.

2. The auto-pilot system as claimed in claim 1, said auto-pilot unit is coupled to a servomechanism unit configured to control one or more control components of the aircraft.

3. The auto-pilot system as claimed in claim 1, wherein said control components comprise moveable components such as ailerons, elevator, rudder and flaps.

4. The auto-pilot system as claimed in claim 1, wherein said processor is further coupled to a Flight Management System (FMS), and is configured to receive data associated with one or more external parameters.

5. The auto-pilot system as claimed in claim 4, wherein said processor is configured to process the data associated with the external parameters and the flight data and generate one or more predictive control values.

6. The auto-pilot system as claimed in claim 4, wherein said database comprise historical data collected between a fixed path destination, including at least one of climate condition variables, feedback received from pilots during the flight, and the flight operating data collected over the flight duration.

7. The auto-pilot system as claimed in claim 4, wherein data associated with said external parameters comprises speed, altitude, roll, pitch, navigation path, temperature.

8. A method of providing an autopilot system comprising:
   operating an auto-pilot unit according to one or more pre-determined information comprising at least one of speed, altitude, pitch and roll;

receiving, at a control value generation unit (CGU) at least one flight data stored in a database;

receiving, at the CGU at least one external parameter, said external parameter is captured by one or more sensors;

processing said at least one flight data and at least one external parameter via at least one processor;

generating at least one predictive control value based on said at least one flight data and at least one external parameter via the at least one processor;

providing the generated predictive control value to an override unit; and accepting or ignoring the predicted control value based on a pilot's selection.

9. The method as claimed in claim 8, further comprising operating the auto-pilot unit according to the accepted predicted control value generated by the control value generation unit.

10. The method as claimed in claim 8, further comprising:

receiving and storing pilot's feedback on the predicted control value in said database.

* * * * *